March 16, 1954 K. S. DUNLAP ET AL 2,672,523

TELEPHONE SUBSCRIBER

Filed Sept. 16, 1949 5 Sheets-Sheet 1

INVENTORS K. S. DUNLAP
W. A. MALTHANER
BY William F. Simpson
ATTORNEY

March 16, 1954 K. S. DUNLAP ET AL 2,672,523

TELEPHONE SUBSCRIBER

Filed Sept. 16, 1949 5 Sheets-Sheet 2

INVENTORS K. S. DUNLAP
W. A. MALTHANER
BY William F. Simpson,
ATTORNEY

INVENTORS K. S. DUNLAP
W. A. MALTHANER
BY William F. Simpson.
ATTORNEY

March 16, 1954 K. S. DUNLAP ET AL 2,672,523

TELEPHONE SUBSCRIBER

Filed Sept. 16, 1949 5 Sheets-Sheet 4

INVENTORS K. S. DUNLAP
W. A. MALTHANER
BY William F. Simpson
ATTORNEY

March 16, 1954 K. S. DUNLAP ET AL 2,672,523

TELEPHONE SUBSCRIBER

Filed Sept. 16, 1949 5 Sheets-Sheet 5

FIG. 12

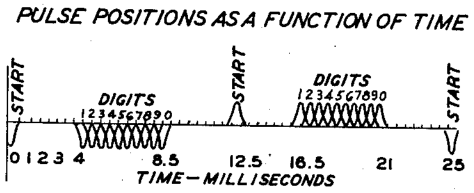

FIG. 12A

GENERATION OF START PULSES

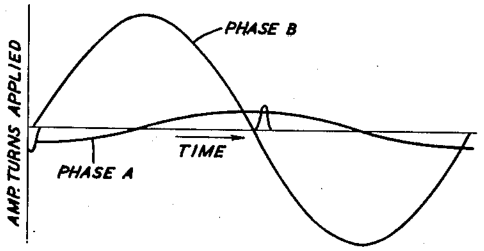

FIG. 12B

GENERATION OF PULSES REPRESENTING DIGIT 1

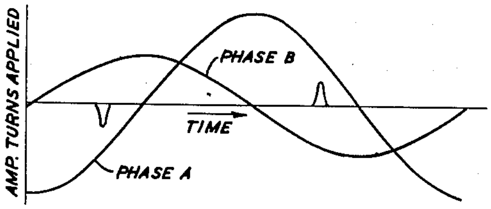

FIG. 12C

GENERATION OF PULSES REPRESENTING DIGIT 2

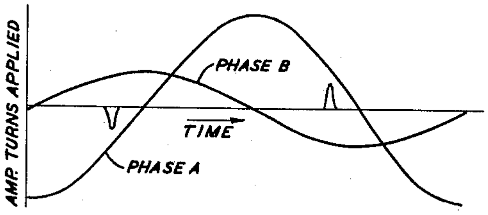

FIG. 12D

GENERATION OF PULSES REPRESENTING DIGIT 0

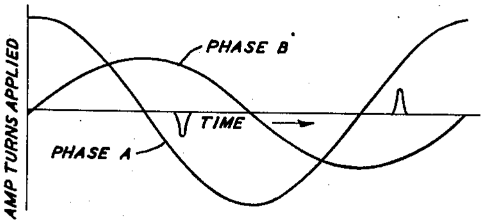

FIG. 12E

THE START PULSES AND PULSES REPRESENTING THE DIGIT 2 AS APPLIED TO THE LINE DURING ONE CYCLE OF THE EXCITATION CURRENT

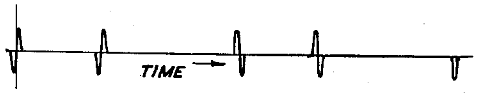

INVENTORS K. S. DUNLAP
W. A. MALTHANER
BY William F. Simpson
ATTORNEY

Patented Mar. 16, 1954 2,672,523

UNITED STATES PATENT OFFICE 2,672,523

TELEPHONE SUBSCRIBER

Kermit S. Dunlap and William A. Malthaner, Summit, N. J., assignors to Bell Telephone Laboratories, Incorporated, New York, N. Y., a corporation of New York Application September 16, 1949, Serial No. 116,068

14 Claims. (Cl. 179—81)

This invention relates to an improved telephone subscriber's station apparatus and more particularly to improved calling and supervisory equipment employed in an automatic telephone exchange system.

The object of the present invention is to provide an improved subscriber's station with supervisory means for control of the calling and talking equipment.

In accordance with an exemplary embodiment of this invention supervisory equipment at the subscriber's station is arranged to cooperate with the calling equipment which is preset in accordance with the entire number to be called before the call is initiated; which operates at a high speed after the call is initiated and transmits identifying signals repeatedly until the signal transmitting equipment is stopped by the supervisory means in accordance with the present invention under control of equipment at the central station.

An object of this invention is to provide a telephone subscriber's subset comprising transmission equipment and signaling equipment each of which can be associated with the transmission line by contacts which are jointly controlled mechanically at the subset by the subscriber and magnetically from the central office in such a way that either the transmitting equipment or the signaling means are connected to the transmission line but not both, in order to prevent interference between the transmission equipment and the signaling equipment. This interference takes the form of losses to speech currents, losses to signal currents and false operation of signal current equipment at the receiver at the central office due to speech currents.

A feature of the invention relates to a magnetic holding device for controlling contacts and circuits in the subset in such a way that the magnetic holding device is disconnected from the subscriber's line at about the same time that the signaling equipment is disconnected from the line.

As in previous systems of the type set forth in a patent application of Parkinson, Serial No. 39,015, filed July 16, 1948, which issued on March 7, 1950 as Patent 2,499,606 each digital position of the called subscriber's designation is represented by pulses wherein the identity or character of the respective digits or magnitude thereof is determined by the time elapsing between the two pulses. As set forth in the above-identified Parkinson patent, a plurality of impulse coils are employed at the subset or subscriber's station to generate the pulses transmitted to the central station under control of an alternating current wave received from the central station. In addition, a manual selecting device is provided at the subscriber's station to permit the subscriber to select the character or symbols of digits of the various digital positions of the called subscriber's identification.

An application of Hill and Parkinson, Serial No. 115,016, filed September 10, 1949, which issued on June 3, 1952 as Patent 2,598,695 discloses an improved stepping or commutator arrangement at the subset which is small, lightweight and which may be readily operated by power transmitted from the central station over the subscriber's line. This equipment is provided to make the proper connections between the impulse coils and the subscriber's line for each digit or digital position of the called subscriber's designation.

Novel features of the exemplary arrangement disclosed herein but not claimed are claimed in one of the above-identified applications or in an application of Parkinson, Serial No. 35,930, filed June 29, 1948, now Patent No. 2,597,898, granted May 27, 1952.

Another object of this invention is to provide improved switching and supervisory equipment which is jointly controlled by the subscriber and the central office.

A feature of this invention relates to supervisory and switching equipment located at the subscriber's station and controlled by the central office for maintaining the calling equipment associated with the line extending to the central office in response to initiation of each call by the subscriber.

Another feature of this invention relates to supervisory and switching equipment located at the subscriber's station for disassociating the calling equipment from the line after sufficient pulses have been transmitted to the most remote switching office to extend a path to the called subscriber's line.

Another feature of the supervisory equipment relates to automatically connecting the telephone transmitter and receiver to the line extending to the central station in response to each call received over the line.

Another feature of this invention relates to supervisory equipment operative after a talking connection has been established, which automatically reconnects the telephone transmitting and receiving apparatus to the line extending to the central office each time after the subscriber flashes the central office equipment by operating his switchhook or cradle contacts.

Another feature of the invention relates to supervisory and switching equipment located at the subscriber's station for associating the calling equipment at the subscriber's station with the line extending through the central office and disassociating the communication equipment from the line extending to the central office in response to the initiation of each call by the subscriber.

Another feature of this invention relates to a two-step switching device in which the first step is controlled by a subscriber initiating the call and the second step is initiated or controlled from the central office. Both steps occur simultaneously when the subscriber answers the call.

Another feature of this invention relates to the use of a magnetic holding or locking device which is positioned by placing the telephone transmitting and receiving equipment on the cradle or the receiver on the switchhook and then is maintained in this position when the handset or receiver is removed from the supporting member until reversed current is applied to the line from the central office.

The supervisory equipment in accordance with the exemplary embodiment of this invention comprises two sets of switching contacts and a magnetic holding device. One set of contacts is controlled exclusively by the position of the handset or receiver and the other set is jointly controlled by the position of the handset or receiver and by the central office. The first set of contacts operate in substantially the same manner as the usual so-called switchhook or cradle contacts, while the second set of contacts are jointly controlled by the switchhook or cradle of the subscriber's set and by a magnetic holding device controlled from the central office. Placing the receiver on the hook or the handset on the cradle will restore both sets of contacts to their normal or idle condition. The first set of contacts are moved to their off-normal position in response to the initiation of a call by the subscriber removing the handset or receiver from its supporting member. The second set of contacts, however, are maintained in their normal or idle condition at this time by the magnetic holding or locking device. Later, after all signals necessary to select the called subscriber's line have been transmitted to the final switching center employed in establishing the call, the magnetic holding device is actuated or moved to its opposite position, whereupon the second set of contacts move to their off-normal position, disassociate the calling equipment from the subscriber's line and associate telephone transmitting and receiving equipment with the line, thus conditioning the subscriber's station set for telephone communication.

The foregoing and other objects and features of this invention may be more readily understood from the following detailed description of an exemplary embodiment thereof when read with reference to the attached drawings in which.

Figure 11:
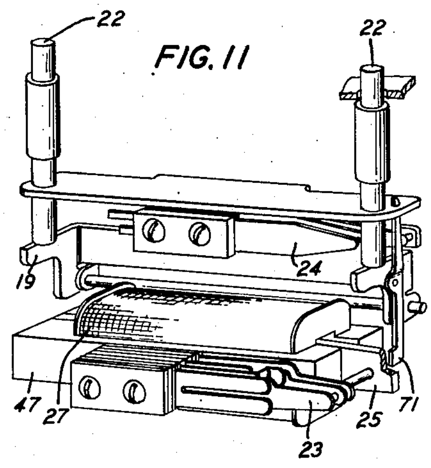
Figure 10:
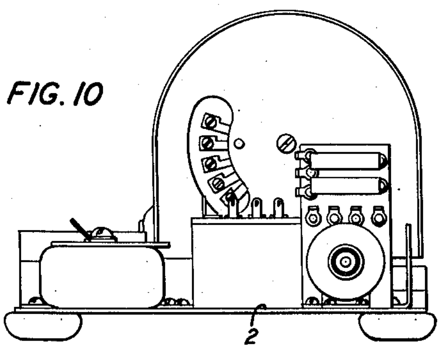
Fig. 10 shows a right-hand elevation of the equipment shown in Fig. 8 along the section line 10—10.

Fig. 11 shows the supervisory and switching control equipment which is manually operated but released under control of the office equipment; and Figs. 12, 12A, 12B, 12C, 12D, and 12E illustrate typical wave forms of the applied alternating current or fluxes produced thereby and typical wave forms of pulses generated by the equipment made in accordance with this invention and located at the subscriber's station.

Figure 1:
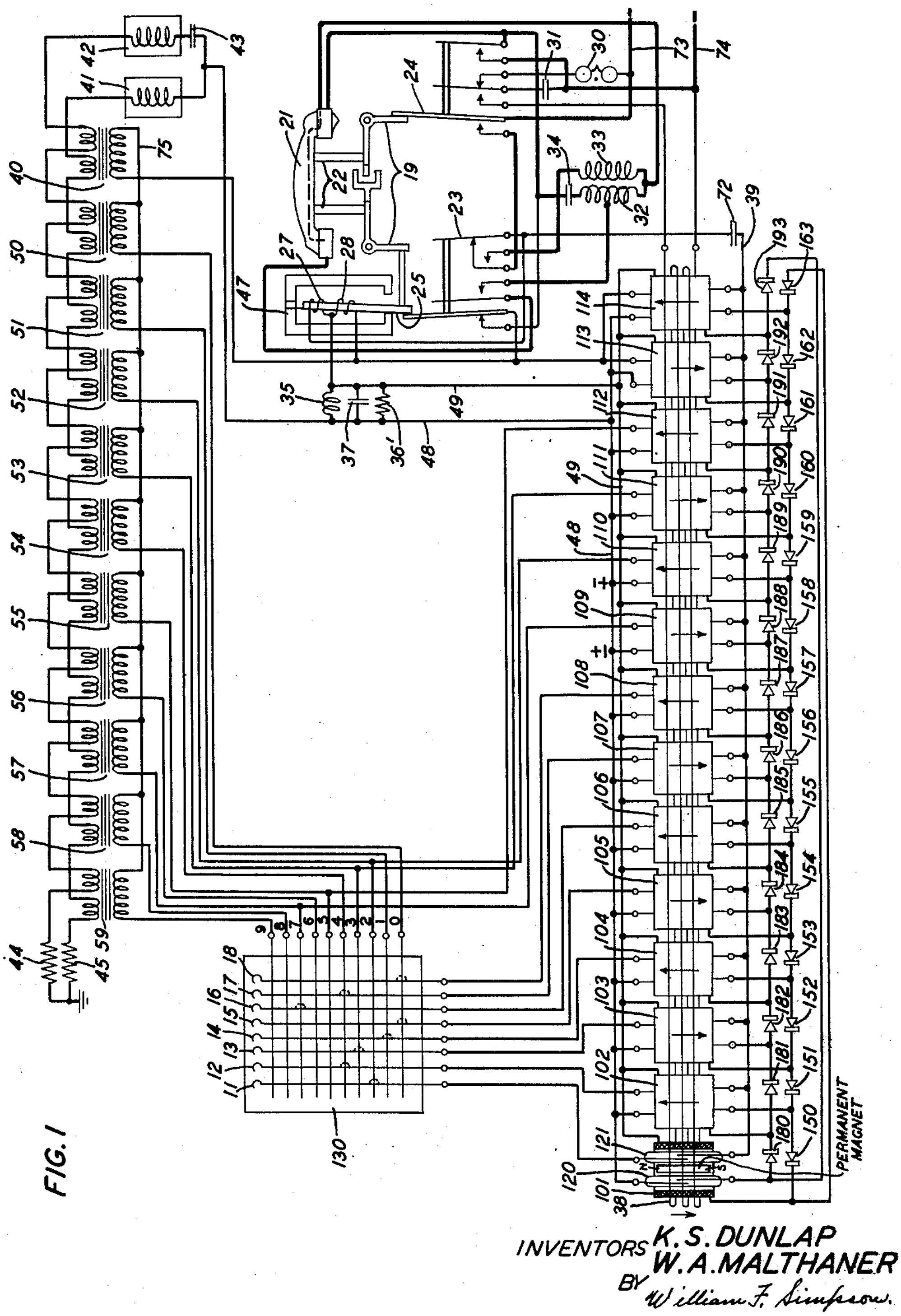
Fig. 1 shows a detailed circuit of the various devices and the manner in which they are connected one with another at the subscriber's station.
Figures 2, 3, 4:
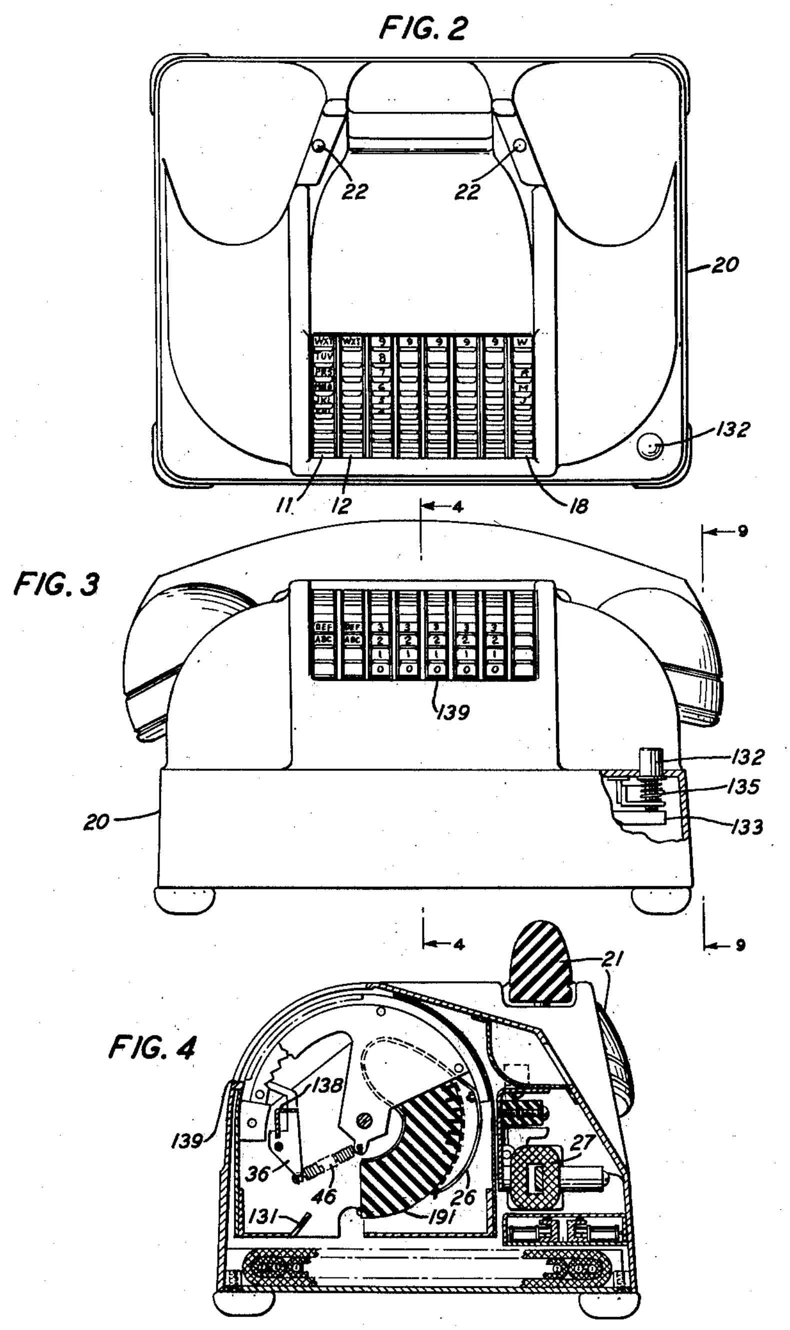
Fig. 2 shows a top view of the subscriber's station equipment embodying the present invention.
Fig. 3 shows a front elevation of the subscriber's station equipment in accordance with the exemplary embodiment set forth herein in detail.
Fig. 4 is a partial section through said equipment at the position indicated by the section line 4—4, Fig. 3.

Fig. 1 shows the over-all schematic of the subscriber's station equipment. As shown in Fig. 1, the subscriber's station equipment includes a handset 21, which when resting upon the support or cradle depresses the pins 22 and causes the bell cranks 19 to actuate contacts 24 to the right and contacts 23 to the left, as shown in Fig. 1. Contacts 24 are controlled solely by the position of the handset 21 while the contacts 23 are controlled jointly by the handset through the pin 22 and bell crank 19 and also a magnetic locking or holding device 47 which includes the windings 27, 28. In addition, the usual induction coil having windings 32 and 33 is provided for transmission of the voice currents.

A group of saturable magnetic impulse coils 40 and 50 to 59 are provided for generating a start pulse and ten stop pulses to represent each possible identity or character of each of the digits of the called subscriber's number. The secondary windings of these coils are connected to a manually controlled switching or dialing arrangement 130 which permits the subscriber to select the designation or number of the called subscriber's station. The manual switching or selector device 130 is, in turn, connected to a plurality of electromagnetic reed-type relays 101 through 114 of the type disclosed in United States Patents 2,245,391 granted to Dickten, Jr., June 10, 1941 and 2,264,622 granted to Ellwood, November 25, 1941. These relays are arranged to successively close their contacts; and thus provide a distributor arrangement for transmitting the pulses representing the identity of the various digits of the called subscriber's number in succession. A group of rectifiers or unilateral conducting devices, 150 through 163 inclusive, and 180 through 193 inclusive, are provided to control the relays 101 through 114 of the distributor as will be described hereinafter.

Although any suitable source of alternating current may be employed to actuate the equipment at the subscriber's station, in the specific embodiment described herein the alternating-current power for actuating the subscriber's station apparatus is supplied to the subset equipment over the subscriber's line 73–74 from a source at a remote point which remote point is usually the central office.

In addition, phase-splitting networks comprising inductances 41, 42 and condenser 43 are provided for applying alternating currents in quadrature to the two sets of primary windings of the impulse generating coils 40 and 50 through 59 inclusive. An isolating and phasing network comprising inductance 35 and condenser 37 is provided to isolate the circuits of the distributor comprising relays 101 to 114 and the impulse generating coils 40 and 50 through 59 inclusive. This network suppresses transients due to the operation of the distributor relays 101 through 114 and thus prevents these transients from interfering with the operation of the impulse coils 40 and 50 through 59 or with the operation of the receiving equipment at the central office. In addition, this network is employed to properly phase the controlling currents supplied to the distributor relays 101 through 114 and the impulse coils 40 and 50 through 59.

In the exemplary embodiment shown, provision is made for the generation of pulses representing eight different digital positions or characters representing the called subscriber's station during each complete cycle of operation of the calling apparatus, and these pulses are repeatedly generated as long as the excitation current is applied. In addition, in the specific embodiment set forth herein pulses representing four additional digits are transmitted during each cycle of operation of the calling apparatus, which additional pulses may be employed to identify the calling station for charging purposes or for other reasons. When these extra digits are not required they will be omitted. Pulses representing any arbitrarily chosen number of digital positions or characters (within reasonable limits) may be generated by properly designed signaling apparatus. Eight digital positions or characters have been selected for this disclosure for representing the called subscriber's station since eight character calling numbers are in common use in telephone systems. It will be understood that these characters may be digits or letters or a combination of the two as commonly used in designating telephone calls. Each of the digits 0 to 9 will be represented by a different combination of two pulses; the pulse combination representing the digit 2 will also represent the letters A, B and C; the pulse combination representing the digit 3 will also represent the letters D, E and F; and so on. Hereinafter, each combination of eight characters will be referred to as each called number irrespective of whether the combination comprises digits or letters and digits.

In accordance with an exemplary embodiment of this invention, each of the pulses generated is of about 1 millisecond in duration. When pulses of this duration are transmitted over various types of voice frequency communication paths encountered in telephone systems, about 3 milliseconds are required for the longest transients to die out sufficiently so that the succeeding pulse may be accurately recognized without interference from the transient caused by the previous pulse. In other words, each transmitted pulse of approximately 1-millisecond duration is in effect lengthened to a decaying alternating current of approximately 3-milliseconds duration. At the end of this 3-millisecond period or any time thereafter a second pulse may be transmitted.

The signaling system employed in this embodiment of the invention comprises a start pulse of 1-millisecond duration for each character, the start pulses being generated at about 11-millisecond intervals as long as the pulsing transformers are energized, and a stop pulse of 1-millisecond duration for each character, each stop pulse reaching its peak value during the 3.5 to 7.44-millisecond interval of time after the start pulse has reached its peak value. In order to provide sufficient margins of safety to permit reliable signaling, over 3.5 milliseconds are allowed for decay of each pulse and the times of the start of transmission assigned to stop pulses representing digits of successive magnitudes differ by .444 milliseconds. Thus, digit 1 is represented by a start pulse followed by a stop pulse which reaches its peak value about 3.5 milliseconds after the start pulse reaches its peak value, digit 2 is represented by a start pulse followed by a stop pulse which reaches its peak value about 3.80 milliseconds after the start pulse reaches its peak value, and so on. It will be observed that the stop pulse for the digit 0 reaches its peak value 7.44 milliseconds after its start pulse and 3.5 milliseconds before the next succeeding start pulse. Thus, there is required an increment of time of 3.5 milliseconds for the decay of the start pulse, 9 increments of time of .444 millisecond each for the generation of a pulse at any one of the ten times necessary to represent the various digits, and a last increment of time of 3.5 milliseconds, all of the latter being required to permit a stop pulse to decay only if it should occur at the end of the ninth increment of time. Consequently, about 11 milliseconds of time elapse between the start pulses of succeeding digits, from which it follows that 11 milliseconds is required in this exemplary system to transmit each digit or character designating the called number.

In order to indicate the starting point of the transmission of a called number, a time interval of approximately 22 milliseconds during which no pulses are transmitted is provided at the beginning of, or between groups of, pulses representing a called number. Thus, a time interval of 111 milliseconds is required to transmit each eight-digit called number and the corresponding no-signal or blank period. When the subset is arranged to transmit extra digits to identify the calling or called station the time of the cycle of the calling apparatus is correspondingly extended.

In accordance with this exemplary embodiment of the invention the signaling pulses are generated by saturation-type pulse generating transformers. There are eleven pulsing transformers 40 and 50 through 59, one for each of the numerals 0 to 9 and one for the start or reference pulse. The excitation current for the apparatus may be obtained locally at the subscriber's station or, as in the exemplary embodiment set forth herein, the excitation current for the pulse coils is transmitted from the central office over the line which interconnects the signaling station with the central office. This current is an alternating current of substantially sinusoidal wave form, and at the signaling station the current is passed through a phase shifting network so that the current is converted to a two-phase source in which the two currents are 90 degrees out of phase.

Each of the pulse generating transformers 40 and 50 through 59 has a single winding secondary and two primary windings. The right and left primary windings of the transformers 40 and 50 through 59 are respectively serially interconnected and connected with the two phases of the excitation current so that one phase of the excitation current is applied to one primary winding of each transformer and so that the other phase of the excitation current is applied to the other primary winding of each transformer. The secondary windings of the transformers 40 and 50 through 59 are connected across the line through a selector switch 130 and a distributor.

The magnetic core of each transformer 40 and 50 through 59 is designed to be saturated except for very small values of ampere-turns, and an electric pulse is generated in the secondary winding of each transformer when the flux is changed from saturation at one polarity to saturation at the other polarity. The flux generated in the core of each transformer 40 and 50 through 59 depends upon the number of turns in the two primary windings of the transformer and upon the current flowing in each winding. In this embodiment of the invention the maximum value of the currents in the circuits associated with each phase are equal. Thus, the flux generated in the core of each transformer 40 and 50 through 59 depends upon the number of turns in the primary windings of the transformer and upon the time-phase relationship between the currents flowing in the primary windings. The pulse attains a maximum value when the flux becomes zero.

For this signaling system it is necessary that all pulses be substantially alike as to wave form and amplitude and that each combination of two pulses representing a digit be of the same polarity. The area under a voltage-time curve representing the pulse is proportional to the total change in flux and to the number of turns in the secondary winding. High intensity energization will produce a high, short pulse, while lower energization will produce a wider pulse having the same area. Thus, if all pulses are to be alike the total maximum ampere-turns on each core must be equal. Assuming equal maxima in the currents of the two phases and a 90-degree phase displacement, then for pulses of equal amplitude and shape the turns $N_A$ and $N_B$ of the two primary windings of each of the transformers 40 and 50 through 59 must be such that $$\sqrt{N_{A_1}^2+N_{B_1}^2}=\sqrt{N_{A_2}^2+N_{B_2}^2}= \ . \ . \ . \ =\text{a constant}$$

where $N_{A_1}$, $N_{A_2}$, etc., are the number of turns in the primary winding of the transformers 40 and 50 through 59 which is connected to phase A of the excitation current and $N_{B_1}$, $N_{B_2}$, etc., are the number of turns in the other primary winding of the same transformers which is connected to phase B of the excitation current. If these conditions are met and if the cores and secondary windings of all the transformers 40 and 50 through 59 are alike the pulses will be suitable for signaling purposes.

In order to cause each transformer 40 and 50 through 59 to generate a pulse at a suitable time during each half cycle of the excitation current, the total ampere-turns driving flux through the transformer cores must be controlled so that the flux in each transformer is zero at the time assigned to the pulse which that transformer serves to generate. This means that $$N_AI_A-N_BI_B=0$$

must be satisfied at the time the pulse is a maximum, where $N_A$ and $N_B$ are as defined above and $I_A$ and $I_B$ are the currents through $N_A$ and $N_B$, respectively. If each phase of the excitation current is of sinusoidal wave form and both phases of equal maximum amplitude, then the timing is determined by the turns ratio as follows:

$$I_A=I_0 \cos \omega t$$
$$I_B=I_0 \sin \omega t$$

and substitution gives $$N_AI_0 \sin \omega t-N_BI_0 \cos \omega t=0$$

$$\frac{N_B}{N_A}=\tan \omega t$$

where $I_A$, $I_B$, $N_A$ and $N_B$ are as defined above, $I_0$ is the maximum current supplied by each phase of the excitation current, $\omega$ equals the frequency in cycles per second multiplied by $2\pi$, and $t$ is the time in seconds.

Thus, when the angular position of the desired pulse is fixed in relation to each half cycle of the excitation current, the number of turns and the polarity of the winding are given by these equations.

Since the magnetic flux in each transformer 40 and 50 through 59 is reduced to zero two times during each cycle of the excitation current it follows that a combination of two pulses representing a digit must occur during each half cycle of the excitation current and that each combination of two pulses representing a digit are of opposite polarity to the preceding two pulses.

Pulsing transformers 40 and 50 through 59 inclusive are interconnected so that the A windings of the transformers are connected in series and connected to the excitation current through phase shifting network 41 and so that the B windings of the transformers are connected in series and connected to the excitation current through phase shifting networks 42 and 43. The phase shifting networks are of conventional design and serve to apply an alternating current to the A windings of the transformers which is displaced 90 degrees in time-phase relationship from the alternating current applied to the B windings of the transformers. Transformers 40 and 50 through 59 inclusive contain two primary windings and these transformers serve to generate the stop or digit pulses.

As discussed hereinbefore, each of the transformers 40 and 50 through 59 inclusive is designed so that its core is saturated except for very small values of flux. Thus, a short pulse is generated in the secondary winding of each transformer when the flux in the core of that transformer passes through zero magnitude. These pulses are illustrated in Fig. 12 which shows the various pulse positions as a function of time. Fig. 12A indicates the ampere-turns applied to the core of transformer 40 as a function of time and shows the time-phase relationship between the start pulses and the ampere-turns applied to this transformer.

Since transformers 40 and 50 through 59 inclusive are connected to both phases of the excitation current, the ampere-turns generated in each transformer will equal the summation of the ampere-turns generated by each phase winding. As discussed hereinbefore, since the maximum value of the current in each phase is equal and since the time-phase relationship between the two alternating currents is fixed, the time at which the summation of the ampere-turns and consequently the flux in each transformer passes through zero magnitude is governed by the number of turns in each phase winding. Fig. 12B indicates the ampere-turns generated in each phase winding of transformer 51 as a function of time and shows the time-phase relationship between the stop pulses representing the digit 1 and the ampere-turns generated in each phase winding. Figs. 12C and 12D indicate the time-phase relationships for the generation of stop pulses representing the digits 2 and 0, respectively. In each case the stop or digit pulse voltage is induced in the output winding when the summation of the ampere-turns in both input windings equals zero, in each case two pulses i. e. a start pulse and a stop pulse are induced during each complete half cycle of the applied alternating current and in each case each successive pulse is of opposite polarity to the preceding pulse as induced by the same transformer. It will be apparent that the particular phase relationships indicated are arbitrary and that other relationships would serve equally well.

As shown in Fig. 1, each pulsing transformer is connected to lines 73 and 74 through condenser 72. This condenser is proportioned to the iterative impedance of the line and to the impedances of the secondary windings of coils 40 and 50 through 59, inclusive, so that each half-cycle pulse as generated by a transformer is applied through condenser 72 to the line as a complete cycle of alternating current of sinusoidal wave form, and the period of each complete cycle of alternating current is equal to the time required for each half-cycle pulse as generated by the transformers.

Fig. 12E indicates the start pulses and pulses representing the digit 2 as applied to the line during one cycle of the excitation current. Fig. 12E in conjunction with Figs. 12A and 12C indicates the relationship between the pulses as generated in the transformers and the pulses as applied to the line.

An excitation current which alternates at 45 cycles per second is employed for this embodiment of the invention. However, it will be apparent that other frequencies would serve equally well.

The primary windings of each of the transformers 50 through 59, inclusive, are proportioned so that each transformer generates a stop pulse corresponding to the digit assigned to that transformer. Thus, each of these transformers generates a pulse which reaches its peak value at a time during the 4½-millisecond interval assigned to stop or digit pulses and there is a ½-millisecond time interval between the peak values of each pulse generated.

During the time that the excitation current is applied to the pulsing transformers a pulse is generated in the secondary of each of the transformers during each half cycle of the excitation current. In order to apply the pulses to the line comprising conductors 73 and 74 in conformity with the called number which it is desired to transmit, selector switch 130 and the distributor are employed to interconnect the transformers with the line.

A selector switch serves to interconnect the pulsing transformers with the line through the distributor. Thus, pulses representing any of the digits 0 to 9 may be impressed across the telephone line in accordance with the setting of the selector switch.

Figures 5, 6, 7:
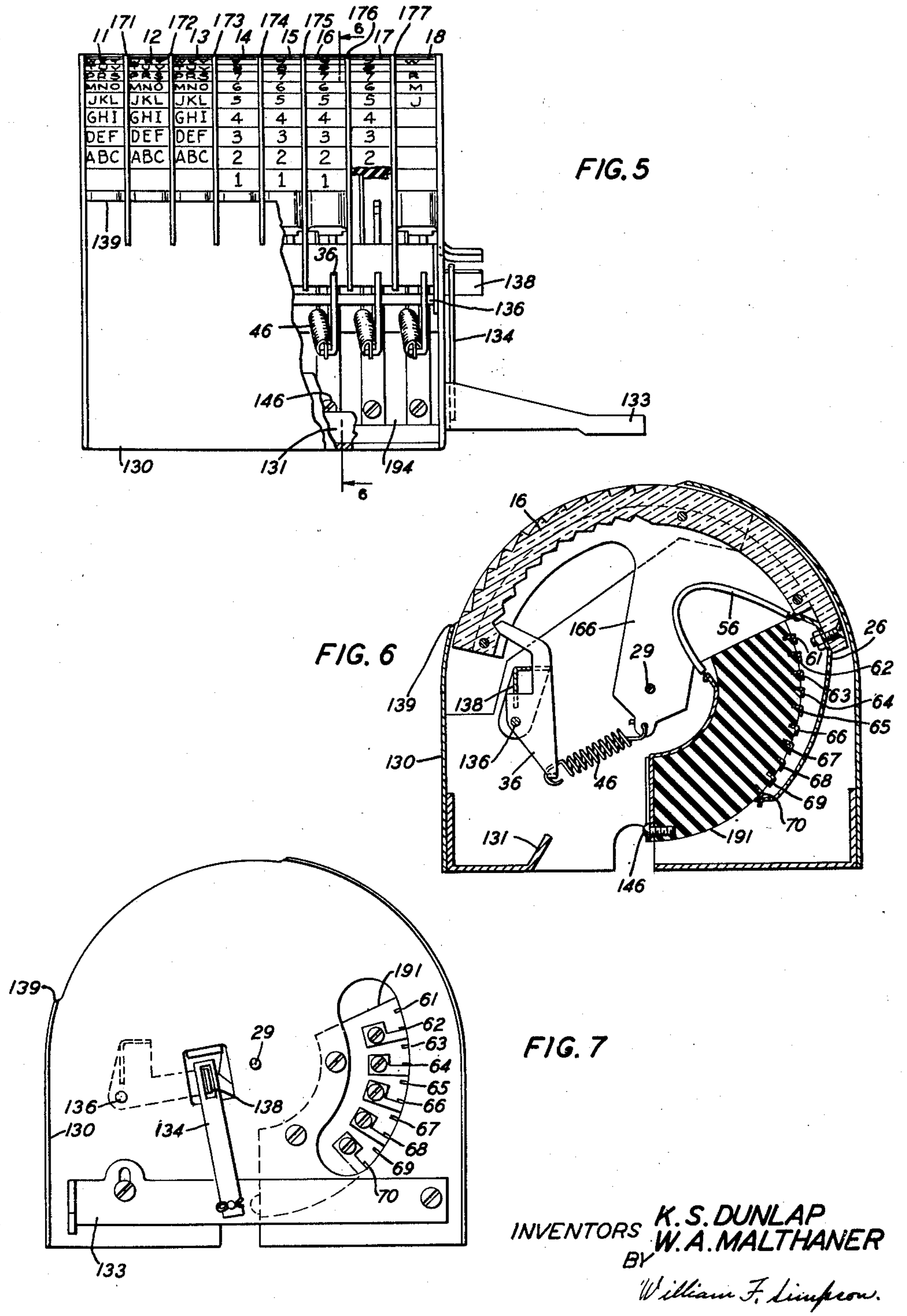
Fig. 5 shows the manual selecting devices employed in the subscriber's station.
Fig. 6 shows a partial section view along the broken line 6—6, Fig. 5.
Fig. 7 shows the right-hand end view of the finger operated setting device shown in Fig. 5.
Figure 8:
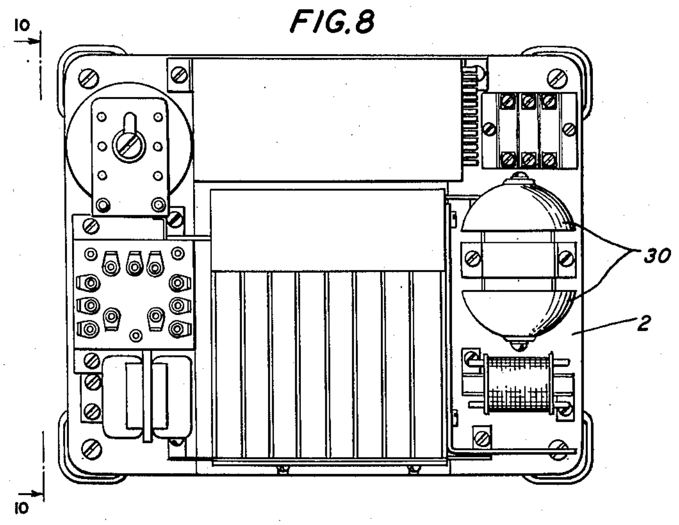
Fig. 8 shows a bottom view of the subscriber's station equipment shown in Fig. 2.
Figure 9:
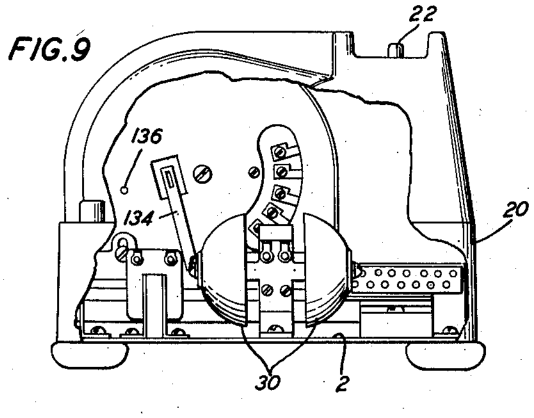
Fig. 9 shows a partially broken away view of the subscriber's station equipment, along the broken line 9—9 of Fig. 3.

Figs. 5, 6 and 7 indicate one embodiment of the selector switch. It is enclosed in case 130, and selector dials 11 to 18 and release lever 133 are accessible to an operator. The selector dials are made of a non-conducting material such as hard rubber or plastic, and each dial is provided with ten indentations along its outer periphery. Each indentation is designated by a letter or number conforming to the telephone signaling system, and each is of suitable configuration to permit an operator's finger to engage and move the dial. The selector dials are separated by spacers 171 to 177 which are attached to case 130. As indicated in Fig. 6, each dial is attached to an individual support 166 so that each dial may be moved approximately one-fourth of a revolution about shaft 29. The inner surface of each dial is provided with ten grooves which correspond to the finger indentations on the outer periphery of the dial. The grooves on each dial serve to enage with a detent pawl 36 to secure each dial in one of the ten possible positions as selected by the operator. As indicated in Fig. 6, detent pawl 36 which cooperates with dial 16 is pivoted about shaft 136. Spring 46 is attached between support 166 and pawl 36 so that pawl 36 is normally forced against dial 16, thereby securing the dial in a fixed position by engaging with one of the ten grooves. Spring 36 also serves to apply a continuous force to support 166 which tends to rotate support 166 and dial 16 in a clockwise direction about shaft 29. The grooves on the dials and the detent pawls are shaped and positioned so that by pressing upon the finger indentations in a dial an operator can move the dial in either direction and so that the ratchet action of the pawl against the grooves secures the dial in any one of the ten positions to which it may be moved. The rotary movement of the dials is limited to about one-fourth of a revolution by stop 131 and insulator 191.

Release arm 138 is connected with release lever 133 through lever 134 and is provided with slots to engage each detent pawl. When lever 133 is in its normal position, arm 138 permits each detent pawl to engage with a groove in the corresponding dial. When lever 133 is depressed, arm 138 is moved in a clockwise direction about shaft 136 and the detent pawls are disengaged from the dials, thereby permitting the spring associated with each dial to cause each dial to return to its initial position.

A spring contact is connected to each dial, and each dial and spring contact may be moved so that the spring contacts may be connected with any one of ten conductors. As indicated in Fig. 6, spring contact 26 is attached to dial 16 and it is electrically connected to terminal 146 through conductor 56. Insulator 191 supports the various terminals and conductors, and the ten conductors 61 to 70 which may be contacted by spring contacts mounted thereon.

The distributor arrangement comprises fourteen relays, 101 to 114, of the type disclosed in the above-identified patents to Ellwood and Dickten and each of the relays in the specific embodiment set forth herein comprises an individual coil surrounding two normally open reed relay contacts 120 and 121. These reeds are made of magnetic material and sealed in a container which may be of glass or other suitable material. The reeds are polarized by means of one or more permanent magnets so that reeds normally remain open. However, when a current of one polarity within the operating range flows in the winding the contacts will not close but when a current of the same or smaller magnitude of the opposite polarity flows through the winding surrounding these contacts the contacts will close. When the current through the winding is then reduced to zero, the contacts remain closed until current of a predetermined substantial magnitude flows in the reverse direction through the windings at which time the contacts open and remain open until the current again flows through the winding in the operating direction. In addition, a common winding 38 is provided for all of the relays and surrounds all of the reeds and their associated polarizing magnets in such a manner that when a current of sufficient magnitude is passed through the winding the reeds of a predetermined one of the relays will be actuated in the opposite manner to that which the reeds of all the other relays are actuated. This behavior may be accomplished by reversing the sense of polarity of the polarizing magnet and of the operating winding of the one relay from the sense of the polarity of the polarizing magnet and operating winding of all the other relays.

It is to be noted that the right-hand reed 121 in each of the relays is employed to interconnect successive ones of the digit selectors 11 through 18 of the selector switch 130 with the common conductor 39, whereas the left-hand reeds 120 are employed to control the operation of the relays of the distributor.

Assume now that the relays 101 through 114 are positioned with the reed contacts in relay 109 closed, while the reed contacts of all the other relays are open. Further assume that controlling frequency for controlling the reeds is applied between conductors 48 and 49. If the alternating current between the conductors 48 and 49 is in such a direction that the upper conductor 48 is negative with respect to 49 at the time the contacts of the relay 109 are closed then a path is completed by the closure of the left-hand contacts of the relay 109 from conductor 48 through the left-hand contacts of relay 109, rectifier 187, winding of relay 108 to conductor 49. Current flows in the above path in such a direction as to maintain the reed contacts of relay 108 open. This is indicated diagrammatically by the arrow shown within the relay 108 which indicates the direction which the current must flow between the windings of this relay to cause its contact to close. When the current flows in the opposite direction the relay will open the contacts as described above. When the alternating current changes polarity so that the upper conductor 48 becomes positive and the lower conductor 49 negative then current ceases to flow through the winding of relay 108 and flows from the upper conductor 48 through the left-hand reed of relay 109 and through the rectifier 188 at this time and through the winding of relay 110 in such a direction as to close its contacts. Upon closure of the left-hand contacts of relay 110, current also flows from the upper conductor 48 through the left-hand contacts of relay 110 through rectifier 158 and the winding of relay 109 to the lower conductor 49. This current flows in such a direction as to open contacts of the relay 109 and interrupt the current flowing through the winding of relay 110. The contacts of relay 110 however remain closed at this time so that current continues to flow through the winding of relay 109 in such a direction as to maintain the contacts of this relay open. When the upper conductor 48 again becomes negative current flowing through the left-hand contacts of relay 110 reverses and flows through the winding of relay 111 and rectifier 159 instead of through the winding of relay 109 and rectifier 158. The direction of flow of current through this winding is such as to cause the reed contacts of this relay to close and complete a circuit through the left-hand contacts of relay 111 and rectifier 189 through the winding of relay 110 in the reverse direction thus causing this relay to release. In this manner the contacts of each of the relays are closed for one-half cycle of the alternating current between conductors 48 and 49.

Furthermore, upon each reversal of the voltage between these conductors 48 and 49 the reed contacts of the succeeding relays are closed and the reed contacts of the previous relays are opened. Consequently, the contacts of reeds close in succession, each one being closed for approximately one-half cycle of the applied controlling alternating current.

The manners in which the various devices and circuits cooperate with each other to form a subscriber's subset capable of cooperating with a switching system to provide improved service will now be described.

The circuits as shown in Fig. 1 are in their normal or idle condition. At this time the ringer 30 is connected in series with condenser 31 across the tip and ring conductors 73 and 74 extending to the central office. At the central office, battery is normally connected to one of these conductors and ground to the other conductor thus placing a charge upon the condenser 31.

If the subscriber is called, ringing current will be applied to these conductors at the central office and cause the ringer 30 to ring and call the subscriber. When a subscriber answers, he will pick up the handset 21 and allow pins 22 to rise. As a result, the contacts 24 will be moved to their left-hand position as shown in Fig. 1. As shown in Fig. 11, the pins 22 in rising cause the bell cranks 19 to rotate in a clockwise direction. As a result, the contacts 24 close and the member 71 is rotated in a counter-clockwise direction away from the armature 25 of the magnetic lock or relay 47. The polarity of the voltage applied to the tip and ring conductors 73 and 74 at the central office is in such a direction at this time as to move the armature 25 to the right as viewed in Fig. 1 and also in Fig. 11 with the result that the contacts 23 are also switched to their opposite or right-hand position.

With both contacts 23 and 24 actuated to their operated positions, the signaling equipment at the subscriber's station comprising the impulse coils 40 and 50 through 59, the selector switch 130 and the distributor relays 101 through 114 inclusive are disconnected from line conductors 73 and 74 and the transmission apparatus and circuits including the transmitter and receiver of the handset 21 and windings 32 and 33 of the induction coil and condenser 34 are connected to the tip and ring conductors 73 and 74 extending to the central office to provide the usual subscriber's transmission circuit and to supply necessary battery to the transmitter of the handset 21.

The circuits then remain in this condition so long as the subscribers are talking over the established circuits. It should be noted that throughout this time a direct-current path exists between the conductors 73 and 74 extending from conductor 73 through the left-hand operated set of contacts 24, the right-hand operated set of contacts 23, induction coil 33, the transmitter of the handset 21 and the right-hand set of operated contacts of the group of contacts 24 to conductor 74 extending to the central office. Variations in the transmitter resistance produced by the voice waves are thus transmitted in the above-described circuit to the central office. In addition, they induce currents in the secondary winding 32 of the induction coil which currents flow in a circuit which extends from the common connection between the transmitter and receiver through the left-hand winding 32 of the induction coil, through the central set of operated contacts of a group of contacts 23, and through the receiver and back to the common points between the receiver and transmitter.

Voice currents arriving over conductors 73 and 74 transmitted over the above-described circuit, including the winding 33 of induction coil and the transmitter of the handset induce currents in the left-hand winding 32 connection to the receiver in the manner described above. The condenser 34 is connected between the upper terminal of winding 32 and the transmitter and increases the transmission efficiency of the handset in the usual manner.

At the termination of the call, the subscriber will replace the handset 21 upon the cradle or supporting members and cause pins 22 to be depressed. As a result, the group of contacts designated 24 will be actuated to the right as shown in Fig. 1, while the contacts 23 will be actuated to the left. In addition, the armature 25 of the switching relay 47 is also actuated to the left. At this time the direct-current path between conductors 73 and 74 is interrupted and the ringer 30 and condenser 31 reconnected between the tip and ring and the normal battery potential applied to the conductor at the central office thus restoring the charge on condenser 31 to its normal value.

When a subscriber at the substation described herein in detail desires to make a call, he will first ascertain the number or designation of the subscriber with which he wishes to communicate. The subscriber will then set the selector switch 130 of Fig. 1, which is also shown in Figs. 2, 3, 4, 5, 6, 7, 9 and 10, by placing his finger over the desired letter or numeral for each digit in the ratchet wheels 11 to 18 and then moving these wheels downward to the guide or stop member, which may form a part of the front of the case of the subset as indicated at 139 in Figs. 3, 4, 5, 6 and 7.

After the subscriber has moved each one of these dials or wheels in this manner, he may check the setting of the instruments to be sure that it is set in accordance with the designation of the desired subscriber's station. At this time this designation appears in the first line above the stop or guide member 139.

If the subscriber has made an error in setting these selector discs, he may correct the error in either of two ways. (1) He may adjust the setting of the individual discs that are not set as he desires, or (2) he may release them all by operation of button 132 shown in Figs. 2 and 3 which depresses the lever 133, shown in Figs. 2, 5, and 7, which lever then moves the link member 135 downward and rotates the latch control plate 138 in a clockwise direction and is viewed in Figs. 6 and 7. The member 138 then engages the pawls or latches 36 associated with each of the selector discs and rotates these latches in a clockwise direction, thus disengaging these pawls or latches from the notches on the inside of the discs as shown in Fig. 6 and permits these discs to be restored to their original or zero position after which the subscriber may again set them in accordance with the designation of the desired subscriber's station.

After the subscriber has set these discs and checked the accuracy of the setting, he is ready to place a call. It should be noted that in setting each disc, a brush 26 carried or supported by each of the discs passes over a group of ten contact bars 61 to 70 and makes contact with one of these bars depending upon the position in which the disc is set by the subscriber. Thus the brush 26 attached to each of the discs makes contact with a corresponding one of the contact bars when the subscriber has set the disc in accordance with the desired number. Such contact arrangement is represented graphically by the selector member 130 in Fig. 1 wherein the brushes attached to the discs are designated 11 through 18. These brushes are moved in engagement with the horizontal bars or conductors as shown in Fig. 1 and represented by the bars 61 through 70 in Figs. 6 and 7.

After having set these discs, the subscriber will then pick up the handset 21 which will allow the pins 22 to rise. The bell crank 19 then rotates and permits both groups of contacts 23 and 24 to be actuated to their operated position. Contacts 24 do so move and are actuated to their left-hand position as shown in Fig. 1. However, the armature 25 of the relay or magnetic holding device 47 maintains the set of contacts 23 in their normal or operated position at this time due to residual magnetic attraction between the armature and left-hand pole-piece as shown in Fig. 1.

The contacts 24 in being operated to their left-hand position connect the condenser 31 across the terminals of the common winding 38 surrounding all of the reeds of the reed relays 101 through 114. The condenser 31 discharges in this circuit and in discharging closes the reed contacts of one of the relays and opens the reed contacts of all of the other relays which may be closed. Assume, for example, the contacts of 110 are closed and the contacts of all of the other relays are opened.

As described hereinabove, the permanent magnet associated with the reeds of relay 110 will then maintain these contacts closed until opened by the reversed magnetic field due to a reverse current flowing through its winding.

Contacts 24 in moving to their left-hand position also connect conductor 73 through the left-hand operated contacts 24 and right-hand normal contacts 23 to the upper terminal of winding 27, and connect conductor 74 through the right-hand operated contacts 24 and the left-hand normal set of contacts 23 to the lower winding terminal of winding 28. The other terminals of windings 27 and 28 are connected together and to the network comprising inductor 35 and condenser 37. Thus, the windings of relay 27 provide a direct-current path between conductors 73 and 74 at this time and provide a path from each of these conductors to the network comprising the elements 35 and 37.

At this time, a circuit also extends from conductor 74 through the right-hand operated contacts 24 and the left-hand normal contacts 23 to the left-hand terminal of the secondary winding of the impulse coil 40. This circuit may be also traced through this winding of coil 40 to the common conductor 75 extending to a terminal of a secondary winding of each of the saturable pulse coils 50 through 59. The circuit will later extend then through various ones of these coils and the selector switch 130 to the right-hand set of reed contacts of the respective relays 101 through 108 or to the corresponding contacts of relays 109 through 112, independent of the selector switch 130. The circuits then extend from the contacts of relays 101 through 112 to common conductor 39 and then through condenser 72, the right-hand break contacts of contacts 23, the left-hand operated contacts 24 to conductor 73 extending to the central office.

The connection of the windings 27 and 28 between conductors 73 and 74 extending to the central office, as described above, causes current to flow from a central office over these conductors through a relay or other responsive device in the central office and also through the windings 27 and 28. The polarity of current flowing through these windings at this time is such that it maintains armature 25 in its left-hand position as shown in Fig. 1.

The equipment at the central office responds to the current flowing over conductors 73 and 74 and through the windings 27 and 28 and causes the line at the central office to be connected to a receiving and registering circuit. Upon connection of the line to this circuit at the central office, the central office equipment will be conditioned to respond to the calling signals transmitted from the subscriber's station. In addition, the equipment at the central office interrupts the supply of direct current to the conductors 73 and 74 and applies alternating current between both of these conductors and ground. The armature of relay 25, however, still remains in the position shown due to the residual magnetic induction of the permanent magnets employed in this device. The alternating current applied to both conductors 73 and 74 at the central office flows over these conductors and through the two windings 27 and 28 in opposition so that it does not produce any appreciable magnetic effect upon the magnetic locking device 47. The alternating current then flows to the network comprising elements 35, 36 and 37. This network is provided to suppress switching transients which may arise due to the operation of the distributor relays and thus prevents these transients from adversely affecting the operation of the pulse coils 40, and 50 through 59. The suppression of these transients also prevents said transients from interfering with the operation of the equipment at the central exchange. This network also controls the magnitude and phase of the alternating voltage between conductors 48 and 49 so that a voltage sufficient to operate the relays at the required time and speed is provided across these conductors, which voltage has a phase such that the distributor relays advance on each half cycle before the pulses from coil 40 are generated during each half cycle. This current consequently flows from the conductor 49 through the winding of relay 109, rectifier or unilateral conducting device 158 and left-hand reed contacts of relay 110 to conductor 48, assuming that the first half cycle of the alternating current applied to conductors 73 and 74 is of the negative polarity. From conductor 48, the alternating current flows through the phase shift networks comprising inductors 41 and 42 and condenser 43 and then through the two sets of primary windings of the saturable impulse coils 40 and 50 through 59, inclusive. Thereafter the alternating currents flow through the resistors 44 and 45 to ground. As described hereinbefore, the two phase shifting networks 41 and 42 and condenser 43 cause the alternating currents flowing through the two primary windings of the impulse coils to be displaced substantially 90 degrees in phase. As described above, during each half cycle of this alternating current, a pulse is generated in output or secondary windings of each of these impulse coils. These pulses are generated at different times in the manner described above. The pulses are first generated in the secondary or output windings of the start coil 40 and thereafter in the output windings of each of the successive saturable magnetic coils 50 through 59, inclusive. Such a pulse is generated by each of the coils for each half cycle of the applied alternating current. Thus, if the first half cycle is substantially complete, such a pulse is generated by each of these coils. However, in the usual case, the phase of this pulse and frequently the pulses generated for the next two or three half cycles will not be accurate so that these pulses usually are not employed at the central office because the circuits of the central office will not have had time to become properly conditioned to receiving these pulses. Furthermore there may be some transient currents which will interfere with the proper generation of these pulses at this time so that these first pulses are generally ignored. However, when the alternating current reverses, after the first half cycle which, as assumed above is negative, or if the first half cycle applied to the specific subset described herein in detail is positive then current flows from the conductors 73 and 74 and through the windings 27 and 28 in opposition to conductor 49 and then through the winding of relay 111, rectifier 159, left-hand operated reed contacts of relay 110 to conductor 48, and then through the impulse coils and phase shift networks to ground as described above. The direction of flow of current through the winding of relay 111 at this time causes its reed contacts to close and in closing, the left-hand reed contacts complete a circuit from conductor 49 through the winding of relay 110, rectifier or unilateral conducting device 189 to conductor 48, through the left-hand operated reed contacts of relay 111 and then to ground in the manner described above. The direction of flow of current through the winding of relay 110 at this time is in such a direction as to cause its contacts to open. Thereafter the contacts of this relay remain open until the relay is again actuated. During this half cycle the pulses will be generated by each of the impulse coils as described above.

During the next succeeding half cycle of the alternating current, a circuit is completed from conductor 49 through the winding of relay 112 and unilateral conducting device 190 to conductor 48 through the left-hand operated reed contacts of relay 111 and then to ground as described above. Current is flowing through the winding of relay 112 at this time in such a direction as to close its contacts. When the contacts of relay 112 close, a circuit is completed through the winding of relay 111 from conductor 49 through the rectifier 160 and closed left-hand contacts of relay 112 to conductor 48 and thus to ground. The direction of the flow of current at this time through relay 111 is in the reverse direction and causes this relay to open its contacts.

During each of these half cycles, certain of the impulse coils are connected to the transmission circuit as will be described hereinafter. However, as pointed out above, the equipment at the central office will usually be designed to employ these first few pulses for conditioning the equipment to accurately respond to the succeeding pulses.

Under the assumed conditions, at the beginning of the next half cycle the contacts or relay 113 will close and cause the contacts of relay 112 to open. The closure of the right-hand contacts of relay 113 at this time connects conductors 73 and 74 together in a circuit which extends from conductor 74 through the right-hand operated contacts 24, through the left-hand break contacts 23 and the operated right-hand contacts of relay 113 to conductor 39, and then through condenser 72 and through the right-hand break contacts 23 and the left-hand operated contacts 24 to conductor 73, thus in effect short-circuiting the line through the condenser 72 and the operated contacts 113. As a result, the output of the impulse coils is in effect disconnected or short-circuited at this time. Consequently, no pulses will be transmitted over lines 73 and 74 even though such pulses are generated during this half cycle by the various coils 40 and 50 through 59, inclusive; likewise, at the beginning of the next half cycle of the alternating current, the contacts of relay 114 close in a manner similar to the operation of the previous relays, and the contacts of relay 113 open. During this half cycle, the right-hand contacts of relay 114 similarly short-circuit or connect the conductors 73 and 74 together through condenser 72 and prevent the transmission of pulses to the central office.

These two half cycles during which no pulses are transmitted constitute a blank interval and are recognized at the central office as indicating the termination of pulses representing a subscriber's designation and that pulses representing the succeeding transmission or repetition of the designation is about to be started. The central office circuits respond to the blank interval by conditioning the received circuits so that they will respond to the next succeeding pulses and record these signals if they are properly received as described in an application of Malthaner and Vaughan, Serial No. 115,961 filed on September 16, 1949 the same date herewith.

During the next half cycle of the applied alternating current, contacts of relay 101 are closed and the contacts of relay 114 open. At this time the brush 11 of the selector switch 130 has been positioned in contact with one of the conductor bars 61 through 70 as shown in Figs. 6 and 7. Assume for a purpose of illustration that it has been moved to engage the No. 2 or third conductor bar from the bottom of Fig. 1 as shown by the dotted half circle. In other words, the brush arm 26 attached to the first selector disc engages the conductor 68 as shown in Figs. 6 and 7 indicating that the first letter designation of the called subscriber's station is an A, B or C. Assume, for example, that it is a C. During this half cycle, the right-hand contacts 121 of relay 101 are closed and connect the brush arm 11 to the common conductor 39. Consequently, when the start pulse coil 40 generates a pulse, this pulse is transmitted over the following path to conductors 73 and 74 to the central office. This path may be traced from conductor 73 through the left-hand operated contacts 24, the right-hand break contacts 23, condenser 72, common conductor 39, right-hand contacts 121 of relay 101, brush arm 11, the No. 2 horizontal conductor of the selector switch 130, the secondary winding of the impulse coil 52 and the secondary winding of the start pulse coil 40 and through the left-hand break contacts 23 and the right-hand operated contacts 24 to conductor 74.

It is noted that the windings 27 and 28 of the polarized relay or locking device 47 are also shunted across these conductors as described above. However, these windings offer high impedance to the pulses transmitted to the central office and thus do not materially interfere with the transmission of these pulses.

A short time later during the same half cycle and in the position indicated in Fig. 12 for the No. 2 or C character of the digit or symbol of the called subscriber's number, a pulse is generated in the secondary winding of the impulse coil 52 which pulse is likewise transmitted over the conductors 73 and 74 to the central office over the same circuits described above with reference to the start pulse generated in the secondary winding of coil 40. These two pulses as explained above, identify the character of the first digit or symbol of the called subscriber's number. The condenser 72, together with the secondary winding of coil 52, for the start pulse and condenser 72, together with the secondary winding of coil 40 for the stop pulse comprise a pulse shaping or filter element which tends to eliminate the high frequency components of these pulses and cause the pulses transmitted over the line to the central office to have a wave form approximating a single cycle of a sine wave.

During the next half cycle the reed contacts of relay 102 will close and cause the contacts of relay 101 to open. Closure of the contacts of relay 102 and the opening of the contacts of relay 101 occur very near the beginning of the half cycle. Consequently when the start pulse is generated by coil 40 it is transmitted over a circuit extending from conductor 74, the right-hand operated contacts 24, the left-hand break contacts 23, through the secondary winding of coil 54, the selector disc brush 12 which is assumed to be positioned in contact with No. 4 segment as shown in Fig. 1, the left-hand closed reed contacts of relay 102 to common conductor 39 and then through condenser 72 and through the right-hand contacts of contacts 23 and the left-hand operated set of contacts of contacts 24 to the conductor 73, extending to the central office.

A short time later the stop or digit pulse is generated in coil 54 which is likewise transmitted through the same circuit to conductors 73 and 74 extending to the central office. It is to be noted that the pair of pulses transmitted during the time the contacts of relay 101 are closed has one given polarity while the pair of pulses transmitted during the time the contacts of relay 102 are closed has the opposite polarity. The reversal of polarity of the successive pairs of pulses is illustrated in Figs. 12, 12A, 12B, 12C, 12D, and 12E, in which the successive pulses transmitted during successive half cycles are shown to be of opposite polarity.

As shown in Fig. 1 by the dotted lines the selector switch 130 has been set to transmit a number assumed to be CH3-10740. Consequently, during the second half cycle after the blank interval, pulses will be transmitted from coils 40 and 54 designating G, H or I which we have assumed to be H. During the third half cycle pulses will be transmitted from coils 40 and 53; during the fourth half cycle pulses will be transmitted by coils 40 and 51 and will be transmitted through the contacts of relay 104. Thus during each half cycle following the blank interval a pair of pulses is transmitted under control of one of the brush arms 11 through 18, inclusive as positioned by the selector discs designating the number of the called subscriber's station. Consequently, during each half cycle a pair of pulses is transmitted designating each one of the digits or symbols of the designation.

Each pair of pulses is transmitted during the time successive ones of the distributor relays 101 through 108 are operated. During the ninth half cycle and the succeeding three additional half cycles and relays 109 through 112 operate and transmit four additional pairs of pulses. These pulses are transmitted to identify the calling subscriber's station. As shown in the drawing the left-hand reed contacts of these relays are connected to output windings of coils 57, 55, 53 and 52, thus indicating that the last four or any other specified group of digits of the calling subscriber's designation comprise the number 7532. Consequently this information is also available to the equipment at the central office for switching purposes as well as charging purposes if and when it is desired. Thus during the ninth half cycle the pair of digits identifies the numeral 7 while the pair during the tenth half cycle identifies the numeral 5, etc.

At the end of the twelfth half cycle and at the beginning of the thirteenth half cycle relay 113 will again be operated and effectively short-circuit the line conductors 73 and 74 to the pulses so that no pulses will be transmitted during this half cycle. During the fourteenth half cycle relay 114 likewise operates and causes relay 113 to release. Relay 114 as described above also prevents transmission of any pulses to the central office. These two intervals during which no pulses are transmitted comprise a blank interval as described above to indicate that a complete designation or calling code has been transmitted and that a succeeding one will start following this blank interval. Thereafter the above cycle of operation of the calling equipment at the subscriber's station is repeated until the circuits at the central office function to change the connections of the subscriber's station.

The equipment at the central office in responding to one or more complete sets of signals or portions thereof will establish switching paths through the switches from the calling subscriber's line towards the called subscriber's line.

When the connection has been extended to the called subscriber's line the central office equipment is arranged to interrupt the alternating current applied between both of the line conductors 73 and 74 and ground and apply a direct-current voltage between these conductors of reversed polarity.

The details of the operation of the central office equipment in response to the calling signals transmitted from the subscriber's station and also the details of the arrangement for interrupting the application of the alternating current to the line conductors 73 and 74 at the central office and the application of a direct-current voltage of the reverse polarity between them at this time is described in detail in the above-identified application of Malthaner and Vaughan which application is made a part of this application to the same extent as if fully set forth and repeated herein.

Interruption of the alternating current stops the operation of the impulse coils 40 and 50 through 59 and also stops the operation of the distributor relays 101 through 114.

The application of the direct-current voltage between conductors 73 and 74 in the reverse direction causes the armature of the magnetic relay or holding device 25 to operate to its right-hand position and thus permit contacts 23 to be operated. At this time both contacts 23 and 24 are operated and thus as described above the transmitter and receiver of the handset 21 are connected to the windings 32 and 33 of the induction coil and to the line conductors 73 and 74 extending to the central office. At this time the impulse coils as well as the distributor relays and the selector switch 130 are disconnected from the line so that they do not in any way interfere with the transmission and reception of the voice currents. Thereafter the circuits at the subscriber's station remain in the position described so long as communication takes place between the subscribers and so long as the handset 21 is removed from its supporting yoke or cradle and pins 22 are elevated.

Upon the completion of the call the handset 21 will be placed upon its supports and the pins 22 depressed whereupon both sets of contacts 23 and 24 are actuated to the positions shown in the drawing. Likewise the armature 25 of the magnetic holding device 47 is moved to its left-hand position as shown in the drawing where the circuits to the subscriber's station are returned to their normal or idle condition ready to respond to a call from the central office or to be utilized in making a call to another subscriber in the manner described above.

It is to be understood that the above-described arrangements are illustrative of an application of the principles of this invention. Numerous other arrangements and modifications may be devised by those skilled in the art without departing from the spirit and scope of the invention.

What is claimed is:

1. A telephone subscriber's substation apparatus comprising voice current transmitting and receiving equipment, call signal generating equipment, a subscriber's line extending to a central office, and switching equipment for connecting said transmitting, receiving, and signal generating equipment to said line including a set of manually controlled contacts for connecting only said signal generating equipment to said line, another set of contacts, a manually operable member for mechanically moving said other contacts, magnetically controlled means for controlling the movement of said other contacts, and apparatus responsive to signals received over said line for controlling said magnetically controlled means to connect only said transmitting and receiving equipment to said line.

2. A telephone subscriber's station set comprising a two-position magnetic holding device, means responsive to terminating a call for mechanically positioning said holding device in one position, apparatus responsive to the initiation of a call for mechanically permitting said holding device to assume another position, means for preventing the movement of said magnetic holding device to another position, and apparatus responsive to current of a predetermined polarity for moving said magnetic holding device to another position.

3. In a telephone switching system, a subscriber's station set comprising a magnetic holding relay, a set of contacts controlled by said subscriber, a second set of contacts jointly controlled by said subscriber and said magnetic holding relay, a line interconnecting said subscriber's set with a switching station, means for initiating a call in response to the actuating of said contacts controlled by said subscriber, other apparatus responsive to a predetermined electrical polarity received over said line for actuating said holding relay for setting said second pair of contacts, telephone transmitting and receiving equipment included in said subscriber's set, and connections controlled by the actuation of both of said pairs of contacts for connecting said telephone transmission equipment to said line.

4. In a telephone switching system, a subscriber's set, a line extending from said subscriber's set to said switching system, voice current transmitting and receiving equipment, call signal generating equipment comprising a selector switch, a plurality of impulse coils, and a relay distributor, a first set of switching contacts mechanically controlled, a second set of contacts jointly controlled mechanically at said subscriber's set and magnetically controlled from said switching system; apparatus responsive to the actuation of the first set of contacts for connecting said calling apparatus to said line, a center tapped winding included in said magnetic device, having the end terminals thereof connected to said line apparatus for supplying alternate current from said center tap to said impulse coils and to said relays for actuating said impulse coils and said relays, means responsive to a predetermined signaling condition applied to said line for causing said magnetic device to permit said second set of contacts to be actuated, and circuits controlled by the actuation of said second set of contacts for disconnecting said calling device from said line and connecting said voice current transmitting and receiving apparatus to said line.

5. In a telephone switching system, a subscriber's line, a subscriber's set connected thereto comprising in combination a first set of contacts mechanically controlled at said subscriber's set, a second set of contacts jointly controlled manually at said subscriber's set and electromagnetically over said line, a relay distributor having a plurality of electromagnetic relays included in said subscriber's set, apparatus responsive to the actuation of said first set of contacts for setting said relay distributor in a predetermined condition, and other means responsive to the actuation of said second set of contacts for disabling said distributor.

6. In combination in a telephone subscriber's station apparatus, voice current transmitting and receiving equipment, call signal generating equipment, a subscriber's line, switching equipment for connecting either said voice current transmitting and receiving equipment to said line or for connecting said signal generating equipment to said line, said switching equipment including a set of manually controlled contacts, another set of contacts jointly controlled manually and magnetically, and apparatus responsive to signals received over said line for disconnecting said signal generating equipment and said switching equipment from said line.

7. In a telephone switching system, a subscriber's station set, a subscriber's line terminating thereat, a set of contacts controlled by said subscriber, a magnetic holding relay, a second set of contacts jointly controlled by said subscriber and said magnetic holding relay, means for initiating a call in response to the actuation of said contacts controlled by said subscriber, other apparatus responsive to a predetermined electrical condition connected to said line for actuating said holding relay to actuate said second set of contacts, telephone transmitting and receiving equipment included in said subscriber's set, and connections controlled by the actuation of both of said sets of contacts for connecting said telephone transmitting and receiving equipment to said line and disconnecting said holding relay from said line.

8. In a telephone switching system, a subscriber's station set, a subscriber's line terminating thereat, a set of contacts controlled by said subscriber, a magnetic holding relay, a second set of contacts jointly controlled by said subscriber and said magnetic holding relay, means for initiating a call in response to the actuation of said contacts controlled by said subscriber, other apparatus responsive to a predetermined electrical polarity connected to said line for actuating said holding relay to actuate said second set of contacts, and connections controlled by the actuation of said second set of contacts for disconnecting said holding relay from said line.

9. In a telephone switching system, a subscriber's station set comprising in combination a subscriber's line, a first set of contacts manually controlled by the subscriber, a second set of contacts jointly controlled by said subscriber and by the electrical condition of said line, a source of signaling energy, and connections for applying a predetermined polarity condition to said line for operating both sets of contacts in response to the answering of a call at said subscriber's station.

10. In a telephone switching system, a subscriber's line, a subscriber's station set connected thereto comprising a first set of contacts connected to said line mechanically controlled at said station set, a magnetic holding relay, a second set of contacts connected to said line and jointly controlled mechanically at said station set and magnetically by said holding relay, means responsive to the initiation of a call to actuate said first set of contacts for connecting said magnetic holding relay to said line, and other apparatus responsive to a predetermined electrical signal for actuating said holding relay to actuate said second pair of contacts for disconnecting said holding relay from said line.

11. In a telephone switching system, a subscriber's line, a subscriber's station connected thereto comprising telephone transmitting and receiving equipment, call signal generating equipment, a magnetic holding relay, a first set of contacts mechanically controlled at said station, a second set of contacts jointly controlled at said station and by said magnetic holding relay, means responsive to the actuation of said first set of contacts at said station to initiate a call and to connect said magnetic holding relay and said call signal generating equipment to said line, and other means responsive to a predetermined electrical signal condition applied to said line for actuating said holding relay to operate said second set of contacts to disconnect said magnetic holding relay and said call signal generating apparatus from said line.

12. In a telephone switching system, a subscriber's line, a subscriber's station connected thereto comprising telephone transmitting and receiving equipment, call signal generating equipment, a magnetic holding relay, a first set of contacts mechanically controlled at said station, a second set of contacts jointly controlled at said station and by said magnetic holding relay, means responsive to the actuation of said first set of contacts at said station to initiate a call and to connect said magnetic holding relay and said call signal generating equipment to said line, and other means responsive to a predetermined electrical signal condition applied to said line for actuating said holding relay to actuate said second set of contacts to disconnect said magnetic holding relay and said call signal generating apparatus from said line, and for connecting said telephone transmitting and receiving equipment to said line.

13. In a telephone switching system, a subscriber's line, a subscriber's station connected thereto comprising telephone transmitting and receiving equipment, call signal generating equipment, a magnetic holding relay, a first set of contacts mechanically controlled at said station, a second set of contacts jointly controlled at said station and by said magnetic holding relay, means responsive to the actuation of said first set of contacts at said station to initiate a call and to connect said magnetic holding relay and said call signal generating equipment to said line, other means responsive to a predetermined electrical signal condition applied to said line for actuating said holding relay to move said second set of contacts to disconnect said magnetic holding relay and said call signal generating apparatus from said line, and for connecting said telephone transmitting and receiving equipment to said line, and apparatus responsive to actuation of both sets of contacts by said subscriber for transmitting a recalled signal over said line.

14. In a telephone switching system, a subscriber's line, a subscriber's station set connected thereto, signaling apparatus for signaling over said line included in said subscriber's station set, communication apparatus also included in said subscriber's station set, a magnetic holding device, a first set of contacts mechanically controlled at said station set, a second set of contacts mechanically controlled at said station set and over said line by said magnetic holding device, means responsive to the actuation of said first set of contacts for initiating a call and connecting said magnetic holding device and said signaling apparatus to said line, apparatus responsive to the actuation of said second set of contacts for disconnecting said magnetic holding device and said signaling apparatus from said line and connecting said communication apparatus to said line, apparatus responsive to the answering of a call for substantially simultaneously operating both sets of said contacts, and means operative after the connection of said communication equipment to said line for transmitting a flashing or recall signal over said line by the simultaneous actuation in both directions of both sets of said contacts.

KERMIT S. DUNLAP.
WILLIAM A. MALTHANER.

References Cited in the file of this patent

UNITED STATES PATENTS

| Number | Name | Date |
|---|---|---|
| 1,105,492 | Clement | July 28, 1914 |
| 1,345,852 | Hastings | July 6, 1920 |
| 1,739,889 | Conti | Dec. 17, 1929 |
| 2,091,541 | Williams | Aug. 31, 1937 |
| 2,165,546 | Heller | July 11, 1939 |
| 2,273,530 | King | Feb. 17, 1942 |
| 2,322,851 | Kolb | June 29, 1943 |
| 2,348,758 | Sanbury | May 16, 1944 |
| 2,377,059 | Wheelock | May 27, 1945 |
| 2,386,609 | Hubbard | Oct. 9, 1945 |
| 2,504,814 | Del Rosario | Apr. 18, 1950 |